United States Patent
Dean et al.

(10) Patent No.: US 7,782,981 B2
(45) Date of Patent: Aug. 24, 2010

(54) SIGNAL PROCESSING APPARATUS AND METHOD

(76) Inventors: Michael Dean, 51 Hastings Road, Malvern, Worcestershire WR14 2XE (GB); Paul Nicholas Fletcher, Top Floor Flat, 5 Richmond Hill Avenue, Clifton, Bristol, BS8 1BG (GB); Andrew Robert Nix, University of Bristol, Merchant Venturer's Building, Woodland Road, Bristol BS8 1UB (GB); Mohamad Kamree Abdul Aziz, University of Bristol, Merchant Venturer's Building, Woodland Road, Bristol BS8 1UB (GB)

( * ) Notice: Subject to any disclaimer, the term of this patent is extended or adjusted under 35 U.S.C. 154(b) by 853 days.

(21) Appl. No.: 10/551,628

(22) PCT Filed: Mar. 31, 2004

(86) PCT No.: PCT/GB2004/001386

§ 371 (c)(1),
(2), (4) Date: Feb. 23, 2007

(87) PCT Pub. No.: WO2004/088908

PCT Pub. Date: Oct. 14, 2004

(65) Prior Publication Data
US 2008/0049862 A1 Feb. 28, 2008

(30) Foreign Application Priority Data
Apr. 1, 2003 (GB) ................. 0307471.3

(51) Int. Cl.
*H04L 27/06* (2006.01)

(52) U.S. Cl. ...................................... 375/316
(58) Field of Classification Search ........... 375/316, 375/267, 347, 349, 346; 708/490; 455/562.1, 455/450
See application file for complete search history.

(56) References Cited

U.S. PATENT DOCUMENTS

| 4,688,187 | A | 8/1987 | McWhirter |
| 6,473,467 | B1 * | 10/2002 | Wallace et al. ............ 375/267 |
| 7,289,585 | B2 * | 10/2007 | Sandhu et al. ............ 375/347 |
| 2007/0226287 | A1 * | 9/2007 | Lin et al. .................... 708/490 |

FOREIGN PATENT DOCUMENTS

| EP | 0 951 091 | 10/1999 |
| GB | 2 375 464 | 11/2002 |
| WO | WO 02/093784 | 11/2002 |
| WO | WO 03/049397 | 6/2003 |

OTHER PUBLICATIONS

Written Opinion of the International Searching Authority for International Application No. PCT/GB2004/001386, Jul. 27, 2004.

(Continued)

*Primary Examiner*—Khai Tran
(74) *Attorney, Agent, or Firm*—Stolowitz Ford Cowger LLP (57) ABSTRACT

A signal processing apparatus (200) comprises a plurality of receive antennas (216a-m) arranged to receive a composite signal containing a plurality of transmitted symbols. A joint detector-decoder (218) iteratively enumerates most probable symbols received at the receive antennas (216am) using an enumeration constraint. A processor (220) determines a bit stream corresponding to each most probable received symbol. A method of signal processing for MIMO systems is also disclosed.

24 Claims, 5 Drawing Sheets

OTHER PUBLICATIONS

Written Opinion of the International Searching Authority for International Application No. PCT/GB2004/001386, Oct. 13, 2005.

Abe et al. "Space-Time Turbo Equalization and Symbol Detection in Frequency Selective MIMO Channels", IEEE, pp. 1230-1234 (2001).

Biglieri, et al. "Recent Results on Coding for Multiple-Antenna Transmission Systems", IEEE, pp. 117-121 (2000).

Tao et al. "Low Complexity Post-Ordered Iterative Decoding for Generalized Layer Space-Time Coding Systems", IEEE, pp. 1137-1141 (2001).

Djouadi et al. "A Parallel or Algorithm for the Symmetrical Tridiagonal Eigenvalue Problem", IEEE, pp. 591-595 (1992).

Gupta et al. "Reconfigurable Computer for Space-Time Adaptive Processing", IEEE, pp. 335-336 (1998).

* cited by examiner

SIGNAL PROCESSING APPARATUS AND
METHOD

BACKGROUND OF THE INVENTION (1) Field of the Invention

This invention relates to a signal processing apparatus and a method of signal processing. More particularly, but not exclusively, the invention relates to a signal processing apparatus and method of signal processing for use in multiple input multiple output (MIMO) antenna architecture.

(2) Description of the Art

Current iterative processing techniques allow wireless telecommunications data transmission rates for links between single antenna transceivers that approach the Shannon data capacity limit, for a single input single output (SISO) system. The Shannon data capacity limit is given by:

$$C = W \log_2(1+S/N) \text{ bit/s}$$

Where:

C is the channel capacity

W is the channel bandwidth in Hz

S/N is the signal-to-noise power ratio.

Figure 1:
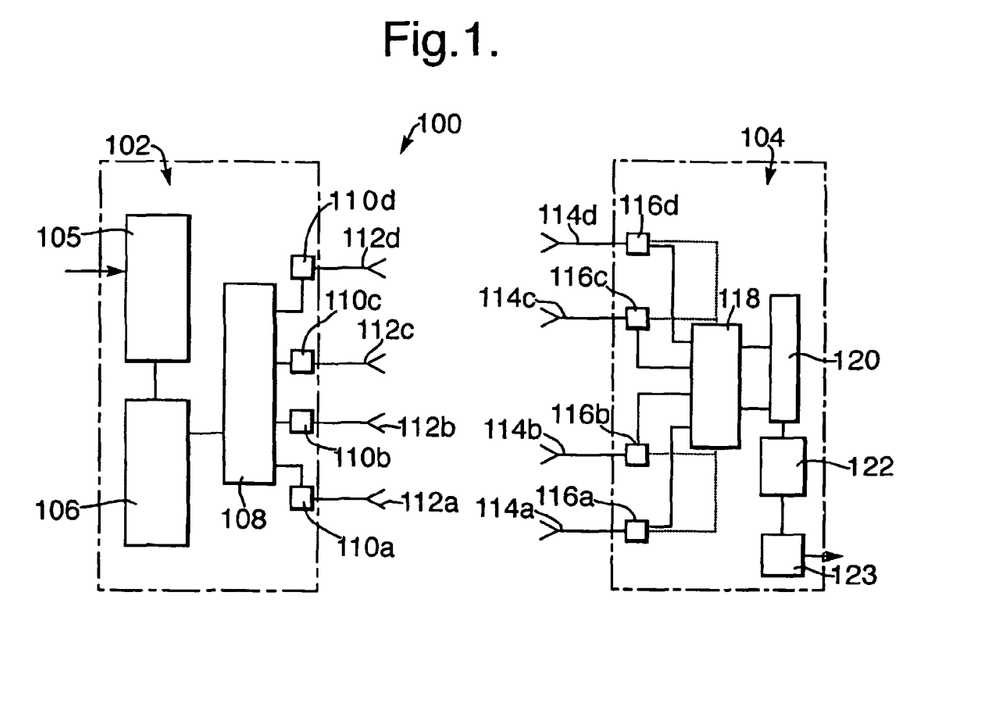
FIG. 1 is a schematic representation of a MIMO architecture of the prior art.

The concept of spatial multiplexing allows the realisation of enormous data transmission rates when multiple transmit and receive antennas are employed. For a given average signal-to-noise ratio (SNR) per receive antenna, or total transmit power, the theoretical MIMO capacity increases linearly with the number of transmit or receive antennas, whichever is the smaller, at high SNR values. Therefore, it is desirable to implement systems with large MIMO configurations, for example four or more transmit antennas (Tx) and four or more receive antennas (Rx), or more. These large MIMO configurations are typically integrated with iterative processing in order to provide reliable transmission of data at high spectral efficiencies, an example of such a prior art MIMO architecture combined with iterative decoding is shown in FIG. 1.

One problem associated with large MIMO architectures is a high computational burden that is imposed upon them by the execution of Log Likelihood Ratio (LLR) calculations at a front end of an iterative decoder on the receive side of the MIMO architecture. This is due to the LLR calculations having to account for every possible candidate symbol across every transmit antenna. These calculations require marginal probabilities to be obtained by summing over all symbol probabilities to obtain bit LLR values. The number of these calculations grows exponentially with the number of transmit antennas and the modulation level. The number of calculations that must be executed to obtain LLR value could be thousands, tens of thousands or even up to millions per second.

SUMMARY OF THE INVENTION

According to a first aspect of the present invention there is provided a signal processing apparatus comprising a plurality of receiving means arranged to receive a composite signal indicative of a plurality of symbols transmitted, substantially simultaneously, from a plurality of remote transmission means, and processing means arranged to iteratively decode each most probable symbol contained in said composite signal, within a constrained enumeration formalism.

The processing means may be arranged to define an enumeration constraint for use in the constrained enumeration formalism.

The use of an enumeration constraint in such an apparatus reduces the computational load required to determine the bit stream when compared to prior art arrangements. This either frees up processing power for other applications or allows a reduced computational and/or electrical power, cheaper processor to be used in determining this bit stream. The reduction in the computational load also increases battery life in portable equipment, as the processor need not be operated as frequently in prior art arrangements.

The processing means may be arranged to perform a QR decomposition upon a channel gain matrix. The enumeration constraint may be a number of entries in an R matrix over which probable symbols are enumerated. This establishes a small area within an R matrix for symbol enumeration rather than using a whole channel gain matrix, thus limiting the size of a list of possible candidate symbols. The enumeration constraint may be of constant dimension.

The processing means may be arranged to determine the most probable symbol by enumerating across all symbol conditional probabilities for each possible symbol.

The processing means may be arranged to convert symbol conditional probability to a bit level, or a symbol level, logarithmic likelihood ratio (LLR).

The apparatus may include a parallel to serial conversion means arranged to convert parallel, bit level, LLR's into a single stream of LLR's.

The apparatus may include a deinterleaving means arranged to deinterleave, bit level, LLR's from the single stream of LLR's. This improves data channel performance as it improves the assumption of independent transmitted bits.

The apparatus may include decoding means arranged to apply iterative soft input soft output (SISO) decoding single bit LLR's to determine a symbol. The SISO decoding may be a Maximum-A-Posteriori (MAP) technique or it may be a Low Density Parity Check (LDPC) technique.

The decoding means may be arranged to pass a symbol, or bit, probability to the processor for inclusion in an iterative enumeration step.

The apparatus may include a hard decision unit that is arranged to determine a symbol based upon a soft output from the decoding means.

According to a second aspect of the present invention there is provided a method of signal processing for a MIMO system comprising the steps of:

i) receiving a composite signal indicative of a plurality of symbols;

ii) performing a QR decomposition upon a channel gain matrix for the composite signal;

iii) defining an enumeration constraint;

iv) calculating possible conditional probabilities for one of the plurality of symbols contained within the composite signal, using the enumeration constraint; and v) iterating step iv), incorporating a most probable symbol for the one symbol determined in the previous iteration of step iv) in the conditional probability calculation operation.

The method may include setting the enumeration constraint to encompass a sub-set of possible transmit antennas.

The method may include defining the enumeration constraint as a number of elements within an R matrix, for example an enumeration sub-matrix within the R matrix.

The method may include calculating a symbol conditional probability in order to determine the most probable symbol transmitted by a given transmit antenna. The method may include converting a symbol conditional probability to a bit level logarithm likelihood ratio (LLR). The method may include calculating a symbol conditional probability in order to determine the most probable symbol received over a given transmission channel.

The method may include converting a plurality of parallel streams of bit level LLR's to a serial stream of bit level LLR's.

The method may include deinterleaving bit level LLR's from the serial stream of bit level LLR's.

The method may include decoding the single bit LLR's, typically using a soft input soft output (SISO) technique, such as for example, a Maximum-A-Posteriori (MAP) technique or a Low Density Parity Check (LDPC) technique.

The method may include making a hard determination of a received symbol based upon a soft output from the decoding step.

According to a third aspect of the present invention there is provided a method of reducing the computational load of a signal processor in MIMO architectures comprising the steps of:
i) receiving composite input signals having spatial diversity from each of a set of n receiver elements;
ii) constructing an n by m channel matrix from values indicative of channel gains between each transmit and receive element;
iii) executing a QR decomposition upon the channel matrix to form an upper triangular R matrix and a unitary Q matrix;
iv) enumerating to determine probabilities of a given symbol being transmitted from a given transmitter using a constrained data sub-set of the triangular matrix; and
v) making a hard decision about which possible symbol is the most probable symbol to have been transmitted so as to reduce the number of enumerations required to carry out a further probability calculation.

The method may include using sub-optimally determined symbol values to generate final definite symbol values.

The method may include using the most probable determined symbol to generate a final hard symbol value.

According to a fourth aspect of the present invention there is provided a computer readable medium having therein instructions for causing a processing unit to execute the method of either of the second or third aspects of the present invention.

DESCRIPTION OF THE FIGURES

The invention will now be described, by way of example only, with reference to the accompanying drawings, in which.

DESCRIPTION OF A PREFERRED EMBODIMENT

Referring now to FIG. 1, a typical MIMO architecture 100 comprises a transmission device 102 and a reception device 104.

The transmission device 102 comprises an encoder 105, an interleaver 106, a serial to parallel converter 108 and mappers 110 a-d, each mapper 110 a-d having a corresponding transmit antenna 112 a-d.

The encoder 105 channel codes source data using, for example Parallel Concatenated Convolutional Codes (PCCC), Serial Convolutional Codes (SCC) or Low Density Parity Checks (LDPC). The channel coded source data is then interleaved by the interleaver and divided into m parallel, independent data steams at the serial to parallel converter 108, in this example four data steams. The four parallel, independent data streams are converted to complex symbols having a plurality of bits, typically, according to Gray coded constellation mapping, by the mappers 110 a-d. Thus, this transmission strategy incorporates Bit Interleaved Coded Modulation (BICM). An individual complex symbol is transmitted, simultaneously, by each of the transmit antennas 112 a-d.

The transmitted signals pass across independent complex Gaussian distributed channels, typically in a rich scattering environment containing multiple, randomly arranged scatterers that may be stationary or mobile, to the reception device 104.

The reception device 104 comprises n, in this instance four but it could be more, or less, than four, receive antennas 114 a-d, channel state information (CSI) estimators 116 a-d and a demapper 118. The reception device also includes a parallel to serial converter 120, a deinterleaver 122 and a decoder 123.

Each receive antenna receives all of the symbols simultaneously transmitted from the transmit antennas via a MIMO channel. Thus each of the receive antennas 114 a-d receives a composite signal containing superposed weighted components of each of the transmitted symbols. The specific weighting of each of the symbols is given by a channel gain value for the channel between a given transmit antennas and a given receive antenna.

If the individual channels between each given transmit antenna and each receive antenna is different each receive antenna will receive a different composite signal. It is this spatial diversity upon receive that allows a symbol determination to be achieved.

In order to determine what symbols were transmitted across the channels prior art systems determine the probability of a given symbol being transmitted from a given transmit antenna by marginalising the other transmitted symbols.

Consider the case of a four transmit antenna, for four receive antenna MIMO system transmitting 16-QAM (Quadrature Amplitude Modulation) symbols, i.e. symbols from a set of 16 possible symbols. In order to marginalise three of the transmitted symbols it is necessary to cycle through the set of sixteen possible symbol values for each of the three transmitted symbols, as shown below. This requires $16^3$ probability calculations to be executed in order to determine the marginal probability of a transmitted symbol, $C_j$ being a specific value, $S_p$. This process must be repeated for the given symbol having each of the sixteen possible symbol values leading to a total computational load of $16^4$ probability calculations.

$$P_{(C_j=S_p)} = \sum_{C:C_j=S_p=1} P[Y_1 Y_2 Y_3 Y_4 \mid C_1 C_2 C_3 C_4]$$

$$S_p \in \{S_1, S_2, \ldots S_{16}\}$$

$P(C_{j=1}=S_1)$ is only concerned with probability of the symbol, $S_1$, having been transmitted from transmit antenna 1, it is not concerned the symbols transmitted from the other three antennas of the systems.

In order to calculate the probability of symbol S, having been received it is necessary to marginalise out the probabilities of the contributions from the other three transmitted symbols. This is achieved by summing the probabilites of all possible combinations of the other three transmitted symbols whilst holding $C_1=S_1$:

$$P[Y_1, Y_2, Y_3, Y_4 \mid S_1, S_1, S_1, S_1]$$
$$\vdots$$
$$P[Y_1, Y_2, Y_3, Y_4 \mid S_1, S_1, S_1, S_{16}]$$
$$P[Y_1, Y_2, Y_3, Y_4 \mid S_1, S_1, S_2, S_1]$$
$$\vdots$$
$$P[Y_1, Y_2, Y_3, Y_4 \mid S_1, S_{16}, S_{16}, S_{16}]$$

This must now be repeated to calculate the marginal probabilities for $C_1=S_2$ to $S_{16}$ in order that all symbol probabilities are calculated. The SISO operates at bit level LLR values and therefore conversion from symbol probabilities to bit level LLR values is required.

An example of a LLR calculation for a single bit is:

$$LLR(b_l) = \log\left[\frac{Pr(b_l=1)}{Pr(b_l=0)}\right] \text{ for a single bit}$$

Where

Pr ($b_1=1$) is the probability of a given bit, $b_1$ having a value 1

Pr ($b_1=0$) is the probability of a given bit, $b_1$ having a value 0

Thus when Pr ($b_1=1$)=1 and Pr ($b_1=0$)=0 LLR ($b_1$)→+∞

Similarly when Pr ($b_1=1$)=0 and Pr ($b_1=0$)=1 LLR ($b_1$)→+∞

And when Pr ($b_1=1$)=Pr ($b_1=0$)=½ LLR ($b_1$)→0

In the general case for symbols, the probability of a symbol transmitted from a given antenna, $j^{th}$, being one of a set of transmitted symbols, C at the given transmit antenna, j, where $1 \leq j \leq m$ and $S_p \in \{S_1, S_2, \ldots, S_{2^{M_c}}\}$. The sum of conditional probabilities, conditioned on the transmitted symbols, summed over all possible transmitted symbol combinations from all other transmit antennas is given by:

$$\Psi(C_j = S_p) = \sum_{C:C_j=S_p} P[Y \mid C]$$

The whole process must be repeated for $C_2$, $C_3$ and $C_4$ thus leading to a very computationally intensive process for the determination of received symbols.

Once the codewords, $C_1$, $C_2$, $C_3$, $C_4$, have been determined they are compared to codewords in a codebook, typically a look up table, in order to determine what bit sequence each of them correspond to, and this bit sequence is output from the receive unit.

Figure 1A:
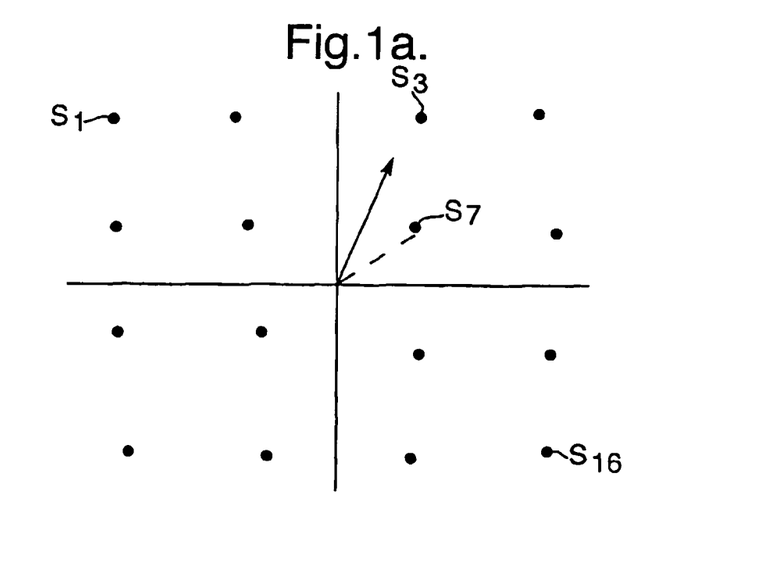
FIG. 1a is an idealised representation of a constellation diagram for 16 QAM.

However, considering the case of 16 QAM, an idealised received codeword constellation diagram consisting of all possible 16 symbols (S1-S16) in 16 QAM is shown in FIG. 1a. In the case of a hard decision making system where symbol S7 was transmitted, systems noise, for example Johnson noise or shot noise within the receiver, can cause the received signal to deviate from the constellation ordinate corresponding to symbol S7 towards, for example, the ordinate corresponding to symbol S3. When such deviation is small a correct hard decision, that the transmitted symbol is symbol S7, is made. However, when such deviation is sufficiently large an incorrect hard decision is made that the transmitted symbol is symbol S3 rather than symbol S7. This is because there is a higher probability that the transmitted symbol is symbol S3 rather than symbol S7 in this case as shown by the received symbol lying closer to symbol S3 than symbol S7 in the constellation diagrams. Such incorrect determinations of a symbol clearly leads to an error in the bit streams output from the receive unit.

In the case of a soft decision systems an incorrect codeword may still be determined based upon the basis of a higher calculated marginal probability however, the determined codewords are compared to allowable sequences of codewords prior to conversion to output bits. This comparison allows non-allowable codeword sequences to be reviewed and errors to be corrected before conversions to an output bit level data stream.

Figure 1B:
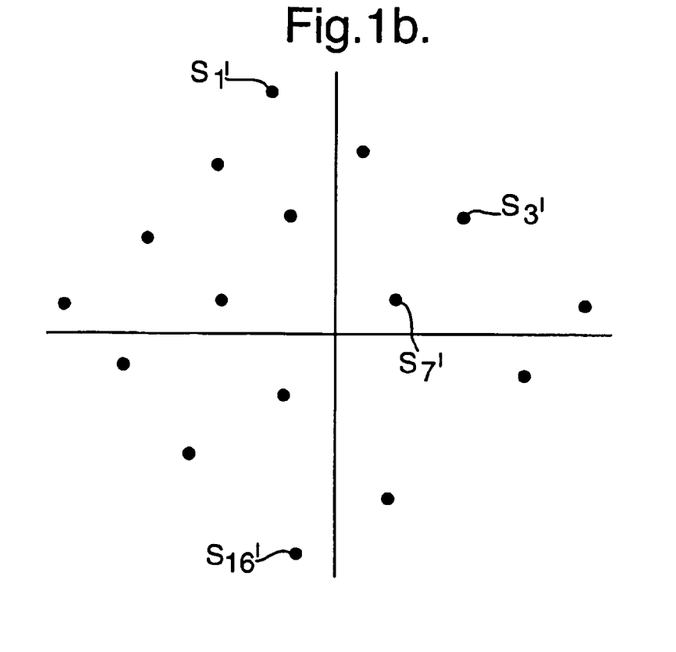
FIG. 1b is a representation of a the constellation diagram for 16 QAM between a transmitter and receiver with a complex channel gain.

In the physical case, each receive antenna will have an independent distorted symbol constellation for symbols received from a given transmit antenna as the channel between transmit and receive antennas is independent, see for example FIG. 1b. The effect of additive, white Gaussian noise, for example shot noise and Johnson noise, is to cause time varying random variations in the location of received signals ($S_1$-$S_{16}$) away from the ideal symbol location within a constellation. A function of Gaussian noise is that the mean of the distribution is the mean, thus the mean locations of the time varying received signal within the constellation is the actual locations of the transmitted symbol. A further feature of this noise is that it is symmetric about its mean point and is also independent of the receive antennas.

As the statistical processes, i.e. the additive Gaussian white noise, that cause the deviation of the received symbol away from its ideal constellation position are independent of each other the probabilities of a given signal being transmitted from a given transmit antenna, and received at the receive antennas can be multiplied in order to yield a joint probability of a given set of signals being transmitted and received across all receive antennas, as follows:

$$P_{(C_j=S_p)} = \sum_{C:C_j=S_p} P[Y_1 \mid \underline{C}]P[Y_2 \mid \underline{C}]P[Y_3 \mid \underline{C}]P[Y_4 \mid \underline{C}]$$

$$S_p \in \{S_1, S_2, \ldots S_{16}\}$$

Using current techniques it is still necessary to enumerate through all possible $16^4$ values of C for each receiver as any variation in C causes a change in the mean received symbols at each receive antenna.

Figure 2:
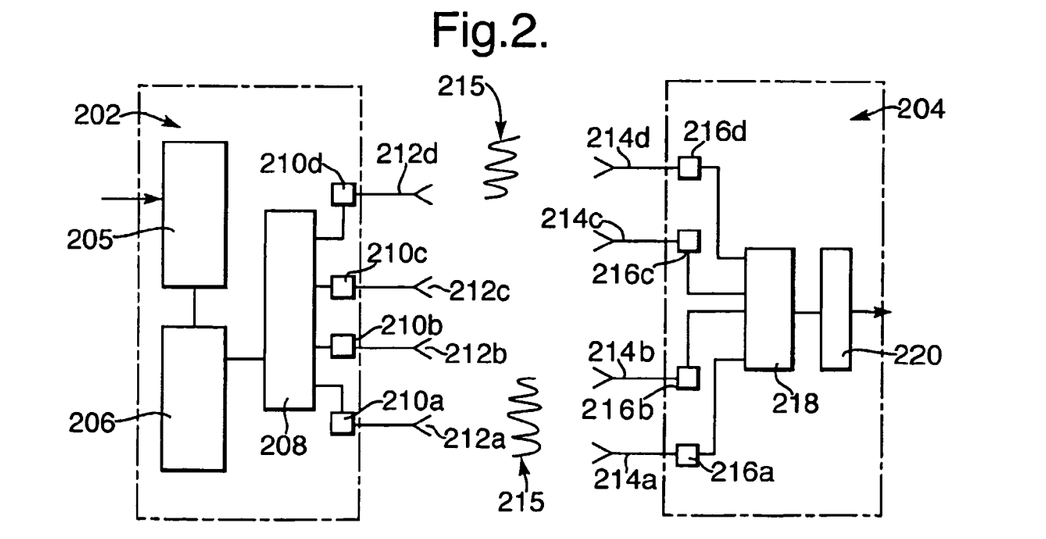
FIG. 2 is a schematic representation of an embodiment of a MIMO architecture in accordance with an aspect of the present invention.
Figure 3:
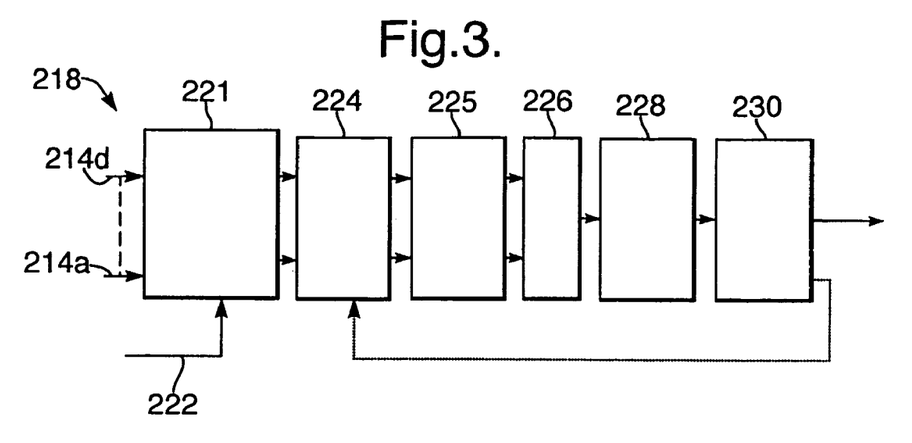
FIG. 3 is a schematic representation of components a joint detect-decode unit of FIG. 2.

Referring now to FIGS. 2 and 3, a MIMO architecture 200, of at least an aspect of the present invention, comprises a transmission device 202 and a reception device 204. The transmission device 202 is substantially similar to that described in relation to FIG. 1 and similar parts are accorded similar reference numerals in the two hundred series.

Typically, signals transmitted from the transmission device 202 are transmitted across a scatter rich transmission environment 215, which introduces spatial diversity upon receive into the signal received at the reception device 204.

The reception device 204 comprises four receive antennas 214 a-d, channel state information (CSI) estimators 216 a-d, a combined joint detector-decoder 218 and a hard decision making device 220, a slicer.

The receive antennas 214 a-d are arranged to receive the signals transmitted from the transmit antennas 212 a-d. The signals are passed to the joint detector-decoder unit 218 where statistics, usually in the form of a log likelihood ratio (LLR), are calculated to produce a likelihood of a particular symbol being present at a given point in a data stream, as will be described hereinafter. The statistics are passed to the hard decision making device 220 where they are processed to make a hard decision as to which symbols are present within the data stream from a set of possible transmitted symbols.

The joint detector-decoder unit 218 comprises a QR decomposition unit 221, which receives inputs from the receive antennas 214 a-d and also channel state information (CSI) 222 from the CSI estimators 216 a-d, a symbol probability processor 224, a symbol to bit LLR converter 225, a parallel to serial converter 226, a deinterleaver 228 and a SISO decoder 230.

The operation of the QR decomposition unit 221 is described immediately hereinafter.

A MIMO data channel can be represented by:

$$Y = HC + \eta$$

$$\text{Where } H = \begin{bmatrix} H_{11} & H_{12} & H_{13} & H_{14} \\ H_{21} & H_{22} & H_{23} & H_{24} \\ . & . & . & . \\ . & . & . & H_{44} \end{bmatrix}$$

for a four transmit antenna, four receive antenna system.

$$\begin{bmatrix} Y_1 \\ Y_2 \\ Y_3 \\ Y_4 \end{bmatrix} = \begin{bmatrix} H_{11} & H_{12} & H_{13} & H_{14} \\ H_{21} & H_{22} & H_{23} & H_{24} \\ . & . & . & . \\ . & . & . & H_{44} \end{bmatrix} \begin{bmatrix} C_1 \\ C_2 \\ C_3 \\ C_4 \end{bmatrix}$$

where:

$Y_1, Y_2, Y_3$ and $Y_4$ are the received signals in a composite signal received at the four receive antennas.

For the general case $Y_i$ is the receiving signal at receive antenna i where $1 \leq i \leq n$ and n is the number of receive antennas.

C is constructed from a matrix of $mM_c$ bits, where m is the number of transmit antennas and $M_c$ is the number of bits per symbol. For example, for 16 quadrature amplitude modulation (16-QAM) $M_c = 4$.

The matrix C for the four transmitter 16-QAM case is given by C, $$b = \begin{bmatrix} b_{11} & b_{12} & b_{13} & b_{14} \\ b_{21} & b_{22} & b_{23} & b_{24} \\ b_{31} & b_{32} & b_{33} & b_{34} \\ b_{41} & b_{42} & b_{43} & b_{44} \end{bmatrix}$$

$$C = \text{map}(b) = [C_1 C_2 \ldots C_M]$$

$C_1$ to $C_M$ are transmitted symbols $\eta$ is a column vector of complex additive white Gaussian noise (AWGN) samples taken from a Gaussian distribution with zero means and variance per dimension, $\sigma^2$ and is a function that is representative of noise within the system, both general thermal noise and component noise.

The channel gain matrix, H, can be described by an orthogonal matrix, Q, and a matrix, R, having an upper triangular structure, subject to the channel gain matrix being a full rank matrix, therefore, there is sufficient diversity within the channels. Such a description of the channel gain matrix is called a QR decomposition of the channel gain matrix.

$$\begin{bmatrix} H_{11} & H_{12} & H_{13} & H_{14} \\ H_{21} & H_{22} & H_{23} & H_{24} \\ \ldots & \ldots & \ldots & \ldots \\ \ldots & \ldots & \ldots & H_{44} \end{bmatrix} = \begin{bmatrix} Q_{11} & Q_{12} & Q_{13} & Q_{14} \\ \ldots & & & \vdots \\ & \ldots & & \vdots \\ & & \ldots & Q_{44} \end{bmatrix} \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix}$$

As Q is orthogonal $Q^\tau Q = I$ as $Q^\tau = Q^{-1}$ $$Q^{-1} \cdot H = R$$

$$Y = HC + \eta$$

$$= QRC + \eta$$

therefore $Q^{-1}Y = RC + Q^{-1}\eta$

Both $Q^{-1}$ and R are fixed, and R has fewer non-zero elements when compared to H as the lower left hand side of R is zeros.

$$Q^{-1}Y = \tilde{Y} = RC + \tilde{\eta}$$

It should be noted that the statistics of the noise vector, $\eta$, are invariant under the transformation of $Q^{-1}$ due to their being circularly symmetric.

In the general case and accounting for any previous decision made relating to transmitted symbol values the marginalised, conditional symbol probabilities are given by:

$$\tilde{\Psi}(C_j = C_p) = \frac{1}{\left(\sqrt{2\pi\sigma^2}\right)} \sum_{\tilde{C}:C_j=S_p} \prod_{i=x+1-Ec}^{x} \exp\left(-\frac{\left|\tilde{Y}_i - \sum_{i=x+1-Ec}^{x} R_{i,k}C_k - \sum_{l=x+1}^{m} R_{i,l}\hat{C}_l\right|^2}{2\sigma^2}\right)$$

where $E_c \leq x \leq m$ with the constraint $E_c$ limiting the vector C to $C=[C_{2+1-Ec}, C_{x+2-Ec}, \ldots, C_x]$ The third term of the numerator $$\sum_{l=x+1}^{m} R_{i,l}\hat{C}_l,$$

is not included in an initial decision for $\hat{C}_m$, based upon $\tilde{\Psi}(C_{j,p})$ as this term describes interference cancellation based upon previously made symbol decisions.

As $\tilde{Y}$ is distributed by $\tilde{\eta}$ in the same way as Y is by $\eta$. Y can be described as follows:

$$\begin{bmatrix} \tilde{Y}_1 \\ \tilde{Y}_2 \\ \tilde{Y}_3 \\ \tilde{Y}_4 \end{bmatrix} = \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix} \begin{bmatrix} C_1 \\ C_2 \\ C_3 \\ C_4 \end{bmatrix} + \tilde{\eta}$$

As can be seen from the above $\tilde{Y}_4$ is dependent only upon the matrix element $R_{44}$. Thus, using the above arrangement it is possible to determine the most probable symbol, $S_p$, by enumerating only through, in the case of 16 QAM, the sixteen possibilities for the value of $C_4$. Whilst this is theoretically possible it would only be acceptable when the signal to noise ratio is very high. This is because if the mean value of a specific channel gain, in this case represented by $R_{44}$, is small the effect of noise in disrupting the channel will be significant.

It is usual to enumerate through the possible symbols over two channels, for example $\tilde{Y}_3$ and $\tilde{Y}_4$ in order to ensure that there is sufficient diversity within the enumerated channels so as to reduce the possibility of all three channel gains enumerated being small enough to be affected by noise. This arrangement reduces the complexity of determining transmitted symbols as, in the example discussed above, $C_1$ and $C_2$ are not required to determine $C_3$ and $C_4$.

Figure 4A:
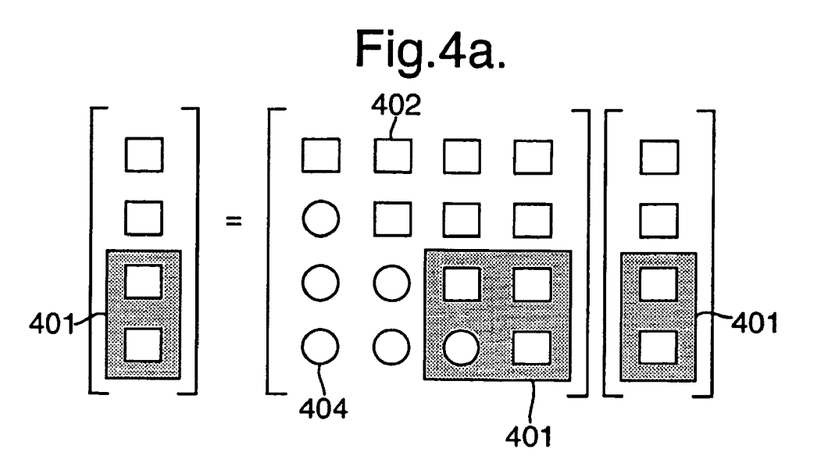
FIG. 4a is a schematic representation of an initial step of enumeration across possible symbols sent from transmit antennas 3 and 4 of a four transmit antenna, four receive antenna MIMO architecture.

Referring now to FIG. 4a, in the example shown below there are assumed to be four transmit antennas, m, and four receive antennas, n, and an enumeration constraint 401, $E_c$, of two, i.e. only two symbols are considered for determination at any one time.

The conditional symbol probability including Gaussian noise, is given by:

$$P(C_4 = S_p) \propto \frac{1}{\left(\sqrt{2\pi\sigma^2}\right)^{Ec}} \sum_{\tilde{C}:C_4=S_p} \prod_{i=3}^{4} \exp\left(-\frac{\left|\tilde{Y}_i - \sum_{k=3}^{4} R_{i,k}C_k\right|^2}{2\sigma^2}\right)$$

when this calculation is dependent solely upon transmit and receive antennas 3 and 4.

Now C is limited to $\tilde{C}=[C_3,C_4]$, as shown in FIG. 4a, the upper right-hand side of the matrix R contains the channel information values, represented as squares 402 in FIG. 4a and the lower left-hand side represents null, zero 404, values of the matrix.

The symbol with the highest conditional probability is selected by the symbol probability processor 224 as an estimated transmitted symbol transmitted from transmit antenna 4 and is given by:

$$\hat{C}_4 = \text{argMax}P(C_4 = S_p)$$

$$S_p \in \{C_1 C_2 \ldots C_{2M}\}$$

In effect the joint probability calculation is simplified to:

$$P_{(C_j=S_p)} = \sum_{C:C_j=S_p} P[Y_3 \mid \underline{C}]P[Y_4 \mid \underline{C}]$$

$$S_p \in \{S_1, S_2, \ldots S_{16}\}$$

by the exclusion of $C_1$ and $C_2$ from consideration.

Once $C_4$ is determined as $S_n$ this value can be fixed for all subsequent calculations as this merely affects the mean value of subsequent calculations:

$$\begin{bmatrix} \tilde{Y}_1 \\ \tilde{Y}_2 \\ \tilde{Y}_3 \\ \tilde{Y}_4 \end{bmatrix} = \begin{bmatrix} R_{11} & R_{12} & R_{13} & R_{14} \\ 0 & R_{22} & R_{23} & R_{24} \\ 0 & 0 & R_{33} & R_{34} \\ 0 & 0 & 0 & R_{44} \end{bmatrix} \begin{bmatrix} C_1 \\ C_2 \\ C_3 \\ S_n \end{bmatrix}$$

In an alternative computational scheme the fourth column of R is multiplied by $S_n$ and subtracted from $\tilde{Y}$ thereby removing the effect of the previously determined from $\tilde{Y}$.

Figure 4B:
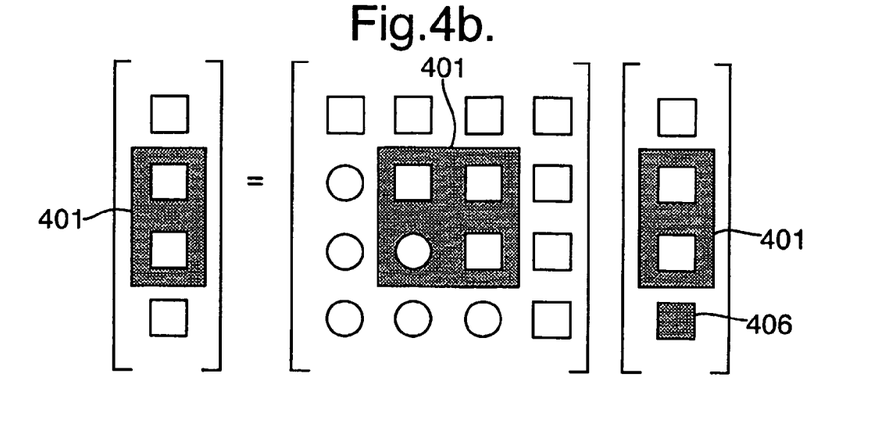
FIG. 4b is a schematic representation of a step of enumeration, subsequent to that of FIG. 4a, across possible symbols sent from transmit antennas 2 and 3 of the four transmit antenna, four receive antenna MIMO architecture.

The effect of fixing $C_4 = S_n$ is shown in FIG. 4b wherein the marginal, conditional probability of any given symbol being transmitted from transmitter 3 is then calculated according to:

$$P(C_3 = S_p) \propto \sum_{\tilde{C}:C_3=S_p} \prod_{i=2}^{3} \exp\left(-\frac{\left|\tilde{Y}_i - \sum_{k=2}^{3} R_{i,k}C_k - R_{4,4}\hat{C}_4\right|^2}{2\sigma^2}\right)$$

As can be seen this conditional symbol probability calculation takes into account the previous symbol estimate made for $\hat{C}_4$ and transmit and receive antennas 2 and 3 are considered for this calculation. The third term in the numerator cancels out the interference from transmit antenna 4, shown in FIG. 4b as a solid square 406.

A soft decision is now made for the symbol transmitted from transmit antenna 3 based upon the conditional probability of the most likely symbol to have been transmitted, $\hat{C}_j$ where j=3, in a similar manner as that for the symbol transmitted from antenna 4 as described hereinbefore.

Figure 4C:
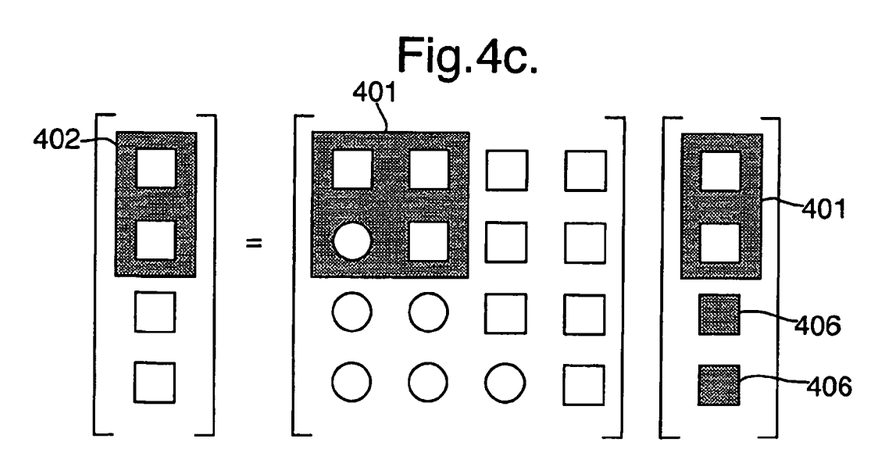
FIG. 4c is a schematic representation of a final step of enumeration across possible symbols sent from transmit antennas 1 and 2 of the four transmit antenna, four receive antenna MIMO architecture.

Referring now to FIG. 4c conditional probabilities of the symbols transmitted by transmit antennas 1 and 2 to receive antennas 1 and 2 are now calculated $$P(C_j = S_p) \propto \sum_{\tilde{C}:C_j=S_p} \prod_{i=1}^{2} \exp\left(-\frac{\left|\tilde{Y}_i - \sum_{k=1}^{2} R_{i,k}C_k - \sum_{l=3}^{4} R_{i,l}\hat{C}_l\right|^2}{2\sigma^2}\right)$$

The vector $\tilde{C}=[C_1,C_2]$ is used to represent these conditional probabilities. The third term in the numerator cancels out the interference effects from antennas 3 and 4, shown in FIG. 4c as solid squares 406.

Again the transmitted symbols are estimated as being the symbol with the largest calculated marginal, conditional probability.

The estimated symbols probabilities are converted to conditional bit probabilities at the symbol to bit LLR convertor 225 through the following:

$$\Psi(b_{j,f}) = \sum_{Cj:Cj=map(b_{j,f}=[1,0])} \Psi(Cj)$$

where for 16-QAM:

$b_3b_2b_1b_0$ $P(C_1)=P(0000)$ $P(C_2)=P(0001)$ $P(C_3)=P(0010)$ $P(C_4)=P(0011)$ $P(C_5)=P(0100)$ $P(C_6)=P(0101)$ $P(C_7)=P(0110)$ $P(C_8)=P(0111)$ $P(C_9)=P(1000)$ $P(C_{10})=P(1001)$ $P(C_{11})=P(1010)$ $P(C_{12})=P(1011)$ $P(C_{13})=P(1100)$ $P(C_{14})=P(1101)$ $P(C_{15})=P(1110)$ $P(C_{16})=P(1111)$

Thus $P(b_0=0)=P(C_1)+P(C_3)+P(C_5)+P(C_7)+P(C_9)+P(C_{11})+P(C_{13})+P(C_{15})$ $P(b_0=1)=P(C_2)+P(C_4)+P(C_6)+P(C_8)+P(C_{10})+P(C_{12})+P(C_{14})+P(C_{16})$ $P(b_1=0)=P(C_1)+P(C_2)+P(C_5)+P(C_6)+P(C_9)+P(C_{10})+P(C_{13})+P(C_{14})$ $P(b_1=1)=P(C_3)+P(C_4)+P(C_7)+P(C_8)+P(C_{11})+P(C_{12})+P(C_{15})+P(C_{16})$ $P(b_2=0)=P(C_1)+P(C_2)+P(C_3)+P(C_4)+P(C_9)+P(C_{10})+P(C_{11})+P(C_{12})$ $P(b_2=1)=P(C_5)+P(C_6)+P(C_7)+P(C_8)+P(C_{13})+P(C_{14})+P(C_{15})+P(C_{16})$ $P(b_3=0)=P(C_1)+P(C_2)+P(C_3)+P(C_4)+P(C_5)+P(C_6)+P(C_7)+P(C_8)$ $P(b_3=1)=P(C_9)+P(C_{10})+P(C_{11})+P(C_{12})+P(C_{13})+P(C_{14})+P(C_{15})+P(C_{16})$ Thus, bit level log likelihood ratios (LLR's) can be given by the natural logarithm:

$$\tilde{\Lambda}(b_j, f) = \log\frac{\Psi(b_{j,f}=1)}{\Psi(b_{j,f}=0)}$$

The bit level LLR's are fed into the parallel serial converter 226 where they are converted into a single stream and are then passed to the deinterleaver 228 which removes the effect of the interleaver 206 at the transmitter.

The decoder 230 maps iteratively decodes the stream of bit level LLR's as a soft output by use of a soft input soft output (SISO) algorithm, such algorithms include Maximum-A-Posteriori (MAP) or Low Density Parity Check (LDPC) algorithms.

Optionally, information obtained from the decoder 230 at each iteration is fed back into the conditional probability calculations, typically this is symbol probability information. This information is treated as a-priori information which increases the accuracy of the information obtained according to:

$$P(C_j = S_p) \propto$$

$$\sum_{\tilde{C}:C_j=S_p} \prod_{i=x+1-E_c}^{x} \exp\left(-\frac{\left|\tilde{Y}i - \sum_{k=x+1-E_c}^{x} R_{i,k}C_k - \sum_{l=x+1}^{m} R_{i,l}\hat{C}_l\right|^2}{2\sigma^2}\right) \prod_{s=x+1-E_c, s\neq j}^{m} P_r[C_s]$$

After a number of iterations, as few as ten have been shown to yield improvements in performance over prior art systems, final, hard, definitive, bit decisions are based upon the soft output values from the decoder 230.

The method detailed hereinbefore estimates which symbol is most likely to have been transmitted using the Maximum-A-Posteriori (MAP) criteria in which:

$$\hat{C}_j = \operatorname*{argmax}_{S_p \in \{C_1 C_2 \ldots C_{2^{M_c}}\}} \Psi(C:C_j = S_p) Pr(C:C_j = S_p)$$

Figure 5:
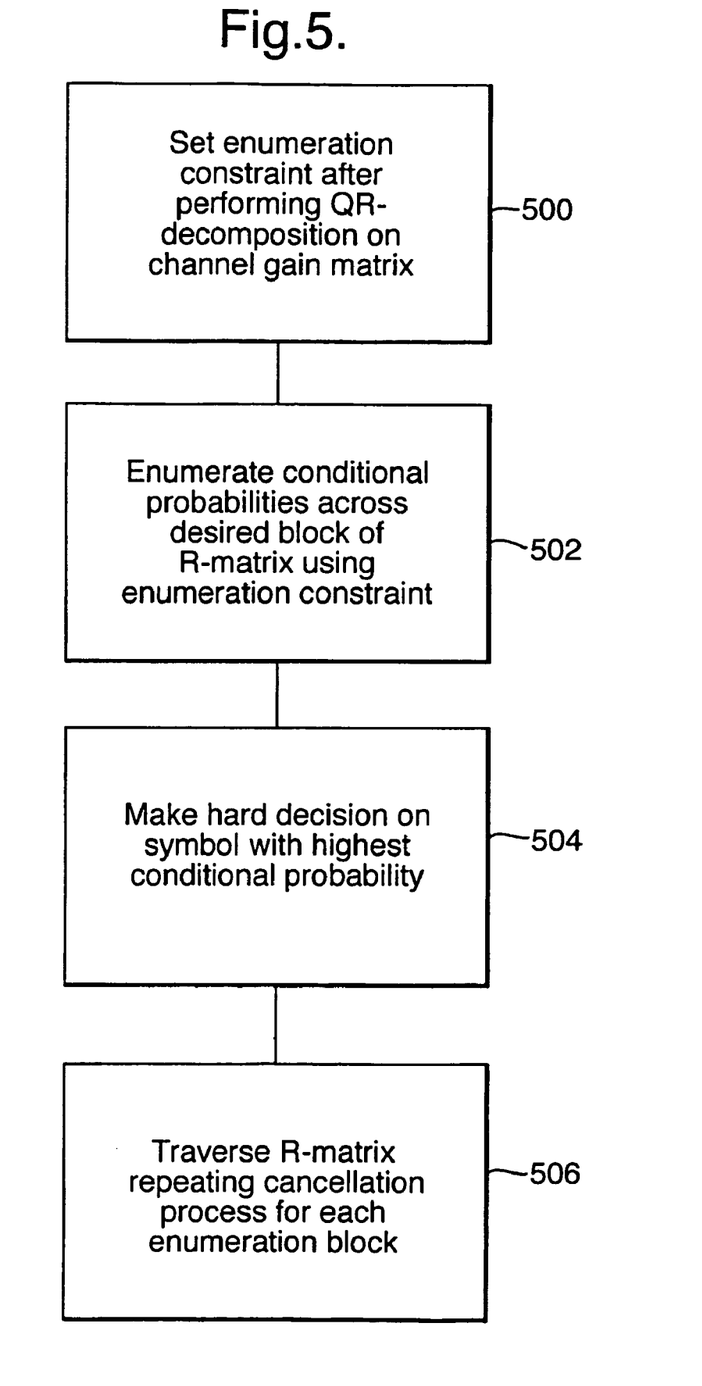
FIG. 5 is a flow diagram detailing a method of signal processing in accordance with an aspect of the present invention.

Referring now to FIG. 5, a method of signal processing for a MIMO system comprises defining a QR decomposition of a channel gain matrix and setting an enumeration constraint upon the matrix (Step 500). Conditional symbol probabilities are calculated by enumerating across the desired block of the R matrix, using the enumeration constraint (Step 502). The effect of the symbol having the highest conditional symbol probability within the desired block of the R matrix is cancelled out (Step 504) and the R matrix is traversed with the cancellation process being repeated for each enumeration block (Step 506).

The apparatus and method described hereinbefore reduce the computational complexity of symbol determination by trading diversity upon receive against computational complexity.

Using the MAP criterion to form decisions as in this approach gives a retained diversity order in symbol estimation that is given by the enumeration constraint $E_c$.

$$\hat{C}_j = \underset{S_p \in \{C_1 C_2 \ldots C_{2mc}\}}{\mathrm{argmax}} \Psi(C:C_j = S_p) Pr(C:C_j = S_p) \text{ (MAP Criterion)}$$

The constraint $E_c$ establishes smaller areas for symbol enumeration instead of using the whole channel matrix. Larger areas lead to a larger list of possible symbol candidates. Computational complexity is maintained within areas of equal size as the matrix is traversed. Enumeration are still related to the modulation mode utilised and is given by:

$$\Gamma = (2^{mc})^{E_c - 1}$$

The approach provides a flexible LLR computation, which is not restricted to the number of transmit antennas used in the MIMO architecture but upon a predefined subset of the transmit antennas at the receiver. The use of feedback within the computational scheme results in an improved computational scheme in which detection and decoding are not disjointed. This is of importance as any improvement in detection yields an improvement in decoding results and vice-versa.

The invention claimed is:

1. A signal processing apparatus comprising:
a plurality of receiving elements configured to receive a composite signal indicative of a plurality of symbols transmitted, substantially simultaneously, from a plurality of remote transmission elements; and
a processing device configured to iteratively decode each of the plurality of symbols contained in the composite signal, wherein the composite signal is represented, at least in part, by a channel gain matrix, wherein the processing device is further configured to perform a decomposition of the channel gain matrix into an orthogonal matrix Q and a triangular matrix R, and wherein the plurality of symbols are decoded within a constrained enumeration formalism of the triangular matrix R.

2. The apparatus according to claim 1, wherein the processing device is arranged to define an enumeration constraint for use in the constrained enumeration formalism, and wherein the enumeration constraint comprises a number of entries in the triangular R matrix over which the plurality of symbols are enumerated.

3. The apparatus according to claim 1, wherein the processing device is further configured to determine a most probable symbol by enumerating across all symbol conditional probabilities for each possible symbol.

4. The apparatus according to claim 3, wherein the processing device is further configured to convert a symbol conditional probability to a bit level logarithmic likelihood ratio (LLR).

5. The apparatus according to claim 4, further comprising a parallel to serial conversion device configured to convert parallel, bit level LLR's into a single stream of LLR's.

6. The apparatus according to claim 5, further comprising a deinterleaving device configured to deinterleave the parallel, bit level LLR's from the single stream of LLR's.

7. The apparatus according to claim 4, further comprising a decoding device configured to apply iterative soft input soft output (SISO) decoding to single bit LLR's to determine the plurality of symbols.

8. The apparatus according to claim 7, wherein the decoding device is further configured to pass a symbol probability to the processing device to iteratively decode each of the plurality of symbols.

9. The apparatus according to claim 7, further comprising a hard decision unit configured to determine the plurality of symbols based upon a soft output from the decoding device.

10. A method of signal processing for a multiple input multiple output (MIMO) system comprising:
receiving a composite signal indicative of a plurality of symbols;
performing a QR decomposition upon a channel gain matrix for the composite signal to identify a Q matrix and an R matrix;
defining an enumeration constraint of the R matrix, wherein the enumeration constraint comprises a number of entries in the R matrix over which the plurality of symbols are enumerated;
calculating possible conditional probabilities for one of the plurality of symbols contained within the composite signal, using the enumeration constraint; and
iterating said calculating incorporating a most probable symbol for the one symbol determined in a previous iteration of the conditional probability calculation.

11. The method according to claim 10, further comprising setting the enumeration constraint to encompass a sub-set of possible transmit antennas.

12. The method according to claim 10, wherein the enumeration constraint is defined as a number of elements within the R matrix over which the one symbol is enumerated, wherein the Q matrix comprises an orthogonal matrix, and wherein the QR decomposition comprises the R matrix and the Q matrix.

13. The method according to claim 10, wherein the possible conditional probabilities are calculated to determine a most probable symbol received over a given transmission channel.

14. The method according to claim 13, further comprising converting the possible conditional probabilities to bit level logarithmic likelihood ratios (LLR's).

15. The method according to claim 14, further comprising converting a plurality of parallel streams of bit level LLR's to a serial stream of bit level LLR's.

16. The method according to claim 15, further comprising deinterleaving the bit level LLR's from the serial stream of bit level LLR's.

17. The method according to claim 10, further comprising making a hard determination of a received symbol based upon a soft output from calculating the possible conditional probabilities.

18. The method according to claim 12, wherein the R matrix comprises an upper triangular structure of non-zero elements and a lower triangular structure of zero elements.

19. A method of reducing a computational load of a signal processor in a multiple input multiple output (MIMO) architecture comprising a plurality of transmission elements and a plurality of receiving elements, wherein the method comprises:
receiving composite signals having spatial diversity from each of the plurality of receiving elements;

constructing an n by m channel matrix from values indicative of channel gains between each of the plurality of transmission elements and each of the plurality of receiving elements, wherein n denotes a number of the plurality of receiving elements, and wherein m denotes a number of the plurality of transmission elements;

executing a QR decomposition upon the channel matrix to form an upper triangular R matrix and a unitary Q matrix;

enumerating to determine probabilities of a given symbol being transmitted from a given transmission element of the plurality of transmission elements using a constrained data sub-set of the triangular R matrix; and making a hard decision about which is the most probable symbol to have been transmitted from the given transmission element so as to reduce a number of enumerations required to carry out a further probability calculation.

20. The method according to claim 19, further comprising using sub-optimally determined symbol values to generate final definite symbol values.

21. A computer readable medium having stored therein computer executable instructions, wherein the instructions are executable by a processing unit to cause the processing unit to perform operations comprising:

receiving a composite signal indicative of a plurality of symbols;

performing a QR decomposition upon a channel gain matrix for the composite signal, wherein the QR decomposition comprises an upper triangular R matrix and an orthogonal Q matrix;

defining an enumeration constraint of the R matrix, wherein the enumeration constraint comprises a number of entries in the R matrix over which the plurality of symbols are enumerated;

calculating possible conditional probabilities for one of the plurality of symbols contained within the composite signal, using the enumeration constraint; and iterating said calculating incorporating a most probable symbol for the one symbol determined in a previous iteration of the conditional probability calculation.

22. The computer readable medium according to claim 21, wherein the plurality of symbols are transmitted by four or more transmitting elements, wherein the composite signal is received by four or more receiving elements, and wherein the operations further comprise:

calculating a conditional symbol probability for a fourth receiving element based on channel information received for a third receiving element and the fourth receiving element to determine a fixed value for a symbol with a highest conditional probability for the fourth receiving element; and calculating a conditional symbol probability for the third receiving element based on channel information received for a second receiving element and the third receiving element and based on the fixed value, wherein the conditional symbol probability for the third receiving element cancels out interference from a fourth transmitting element.

23. An apparatus comprising:

means for receiving composite input signals having spatial diversity from each of a set of n receiver elements;

means for constructing an n by m channel matrix from values indicative of channel gains between each transmit and receive element, wherein m denotes a number of transmission elements;

means for executing a QR decomposition upon the channel matrix to form an upper triangular R matrix and a unitary Q matrix; and means for enumerating to determine probabilities of a given symbol being transmitted from a given transmission element using a constrained data sub-set of the triangular R matrix.

24. The apparatus according to claim 23, wherein the constrained data sub-set comprises a number of entries in the triangular R matrix over which the given symbol is enumerated.

* * * * *

UNITED STATES PATENT AND TRADEMARK OFFICE
CERTIFICATE OF CORRECTION

PATENT NO.         : 7,782,981 B2
APPLICATION NO.    : 10/551628
DATED              : August 24, 2010
INVENTOR(S)        : Dean et al.

Page 1 of 1

It is certified that error appears in the above-identified patent and that said Letters Patent is hereby corrected as shown below:

Title page, item (57), under "Abstract", in Column 2, Line 2, delete "receive antennas (216a-m)" and insert -- receive antennas (214a-d) --.

Title page, item (57), under "Abstract", in Column 2, Line 5, delete "receive antennas (216am)" and insert -- receive antennas (214a-d) --.

Signed and Sealed this
Third Day of July, 2012

David J. Kappos
*Director of the United States Patent and Trademark Office*